United States Patent [19]

Staab

[11] 3,925,667
[45] Dec. 9, 1975

[54] TWO BEAM INFRARED GAS ANALYZER

[75] Inventor: Joachim Staab, Frankfurt am Main, Germany

[73] Assignee: Hartmann & Braun Aktiengesellschaft, Frankfurt, Germany

[22] Filed: Oct. 17, 1974

[21] Appl. No.: 515,518

[30] Foreign Application Priority Data
Oct. 20, 1973  Germany............................ 2352813

[52] U.S. Cl................................. 250/343; 250/344
[51] Int. Cl.² ......................................... G01N 21/36
[58] Field of Search ............... 356/51; 250/343, 344

[56] References Cited
UNITED STATES PATENTS
3,725,702  4/1973  Schaefer ............................ 250/343

*Primary Examiner*—James W. Lawrence
*Assistant Examiner*—T. N. Grigsby
*Attorney, Agent, or Firm*—Ralf H. Seigemund

[57] ABSTRACT

Two infrared beams are intensity modulated by a chopper and thereafter by the same sample gas. One of the so modulated beams is passed to one absorbtion detector chamber, the other beam passes serially through two absorbtion chambers. The three absorbtion chambers in the detector are filled with the substance to be detected in the sample gas. The pressure variations in the second one of the two serially effective chambers are compared with pressure variations in the one chamber receiving the first mentioned beam. This way, interference from substances having absorbtion bands overlapping those of the substance to be detected in the sample gas is substantially eliminated.

7 Claims, 1 Drawing Figure

U.S. Patent  Dec. 9, 1975  3,925,667
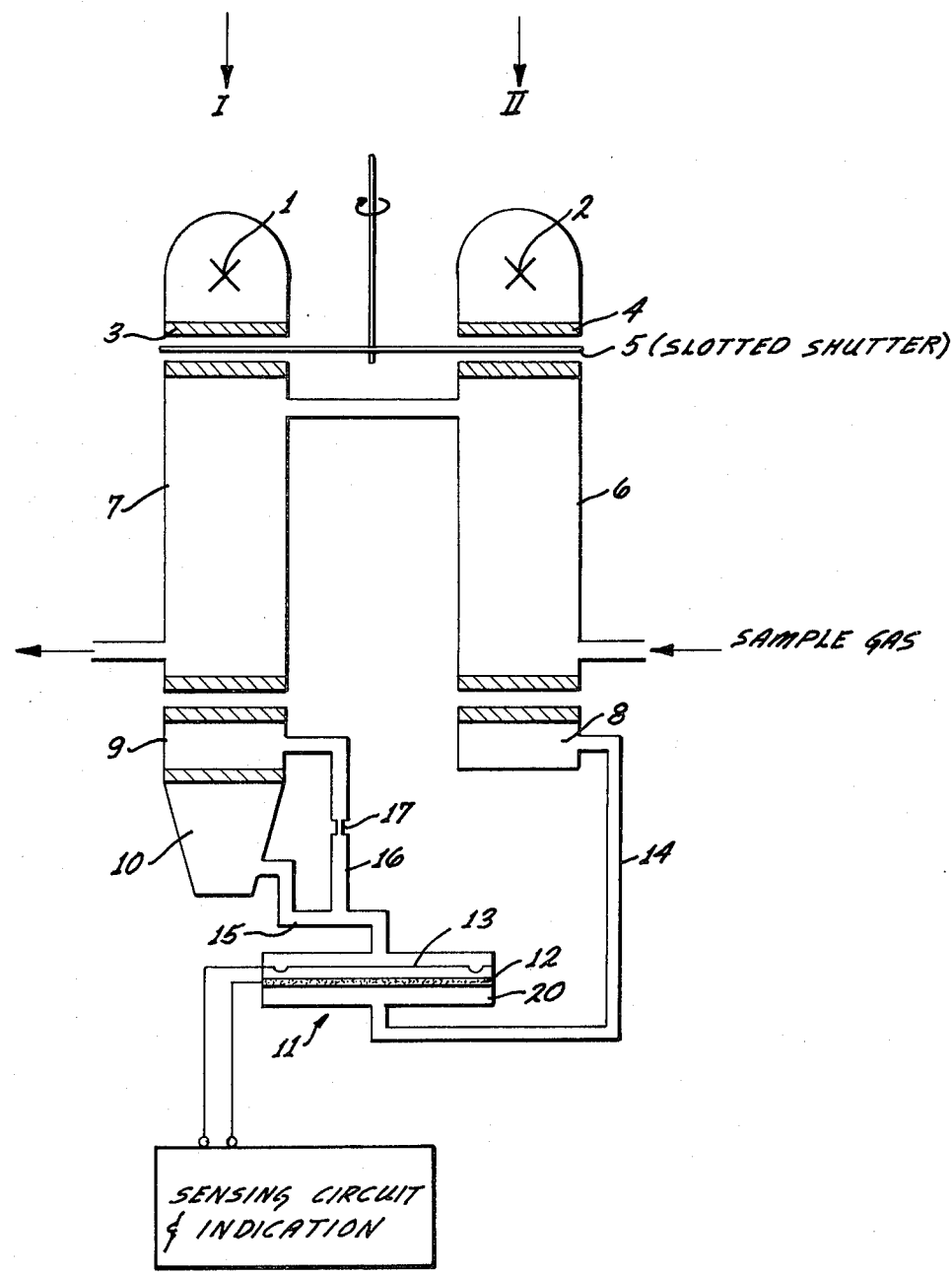

TWO BEAM INFRARED GAS ANALYZER

BACKGROUND OF THE INVENTION

The present invention relates to a twin-beam infrared gas analyzer, and more particularly, the invention relates to gas analyzers of that type wherein two periodically interrupted beams traverse the gas to be analyzed and enter a radiation detector and measuring device.

Gas analyzers of this type are known and frequently comprise several gas filled detector chambers each for measuring radiation through absorbtion, and the pressure difference in these chambers resulting from different absorbtion is detected by a deflecting membrane or diaphragm. The deflections of that diaphragm are then capacitively detected and indicated.

An infrared gas analyzer with such a radiation detecting device is schematically disclosed, for example, in the magazine "Chemie Ingenieur Technik", 1961, No. 6, page 429. Each radiation path of the analyzer is associated with a detector chamber filled with the gas whose concentration in the test gas is to be detected. In order to increase the selectivity of the analyzer with regard to the particular gas, additional gas filled filters and selection enhancing chambers are provided.

The German Pat. No. 1,017,385 describes a single beam-infrared gas analyzer having two optically, serially arranged detection chambers passed through by the beam, one after the other, and these two chambers are interconnected by such a diaphragm capacitor.

Engineering of these radiation detectors has lead to construction of a unitary metallic block for the analyzer containing the detector chambers and the diaphragm capacitor. As far as the selectivity of these two types of instruments is concerned, and regarding the gas component to be detected, the single beam is apparently better than the two beam device. Particularly, other gasses in the test or sample gas having absorbtion bands which overlap those of the substance to be detected in the sample gas, provide in some instances for greater distortion of the measuring result in two beam instruments. This interference by other substances in the indication of gas analyzers can also be termed cross-sensitivity of the instrument. Thus, single beam analyzers have, in some instances, considerably lower cross-sensitivity than two beam analyzers.

The U.S. Pat. No. 2,929,713 deals with the elimination of such interference in two beam analyzers, but this particular analyzer uses sample and reference gas cells respectively in the two beams. Moreover, two optically serially arranged detectors with detector cells under different pressures and a sensing capacitor in each detector provides, ultimately, for the elimination of interference bands through electrical compensation.

DESCRIPTION OF THE INVENTION

It is an object of the present invention to improve (reduce) the cross-sensitivity of two beam infrared gas analyzers.

It is a specific object of the present invention to eliminate as much as possible the effect of interference absorbtion bands on the indication in two beam infrared analyzers in which the sample gas is traversed by both beams.

In accordance with the preferred embodiment of the present invention, it is suggested to provide for the following combination of features in the radiation detectors of such analyzers, whose two beams both traverse the sample gas with the unknown concentration of a particular substance.

a. One of the two beams traverses two detector chambers arranged one behind the other, i.e., in optical serial relationship;

b. the other beam traverses only one detection chamber;

c. a diaphragm/membrane capacitor responds to a pressure difference between the chamber traversed secondly by the one or first beam, and the one chamber traversed by the other or second beam.

The three detection chambers involved are filled with the substance to be detected in the sample gas, and the two optically serially arranged chambers are interconnected for pressure equalization of pressure changes occurring at a slow rate only.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

The FIGURE shows somewhat schematically an example of a two beam infrared gas analyzer in accordance with the preferred embodiment of the invention.

Proceeding to the detailed description of the drawing, the infrared gas analyzer illustrated has two sources of radiation 1, 2 respectively with exit windows 3 and 4. A shutter 5 is driven by a suitable motor and intercepts the radiation from the two sources thereby modulating each of them in phase synchronism.

The Roman Numerals I and II denote the two radiation paths, and both of them have sample cells 6 and 7 passed through by the gas under investigation as indicated by the two arrows. Specifically, that gas contains a substance of unknown concentration whose presence and concentration is to be determined. The two sample cells 7 and 6 are interconnected so that both of them are passed through by the same gas.

Actually, a single sample cell passed through by both beams of radiation may suffice. However, that could lead to optical cross coupling due to perturbations in the gas so that optical separation is preferred. In any event, the two beams traverse the sample gas for the same length, and like quantities of radiation are being absorbed.

The radiation detector is comprised, basically, of three chambers 8, 9 and 10, which are filled with the gas substance to be detected, and of a diaphragm capacitor 11 in a chamber 20 which particularly connects to chambers 8 and 10 and additionally to chamber 9.

The chambers 8, 9, 10 are arranged in that chamber 8 receives directly the radiation that has passed through cell 6, there being correspondingly aligned entrance and exit windows accordingly. Chamber 9 receives analogously radiation exiting from cell 7, but chamber 9 has also an exit window through which adjacently disposed chamber 10 receives its radiation in optical, serial relationship to chamber 9.

A duct 14 connects chamber 8 to one side of chamber 20, separated from the other side by diaphragm electrode 13, which is one of the electrodes of capacitor 11. The other electrode 12 is rigid, i.e. not moving, but permits passage of gas so that the diaphragm 13 is acted upon by pressure from both sides of the diaphragm in chamber 20. This other side of chamber 20 is connected to chamber 10 through a duct 15. The diaphragm 13 partitions the chamber 20.

The modulations of the radiation beams by the light chopper or shutter result in pressure oscillations in chambers 8 and 10 which are transmitted via low flow resistance ducts 14, 15 to the diaphragm. The amplitude of the resulting oscillation is a representation of the concentration of test substance in cells 6 and 7. The equipment is adjusted so that for zero concentration of that substance in cells 6 and 7 a particular steady state is observed on the capacitor. That state is disturbed for non-zero concentration.

The two chambers 9 and 10 are interconnected by a duct 16 which includes a high flow resistance or throttle 17. This pneumatic resistance 17 is selected so that the fast pressure peaks as resulting from the modulated absorbtion will fully develop, but long term pressure changes equalize. Such long term change may result from cumulative absorbtion.

The dimensions of the detector chambers 8, 9, 10 and the concentration of gas therein, have to be chosen so that in the case of concentration zero of the substance in the gas that passes through cells 6 and 7, equal pressure pulses are produced on both sides of diaphragm 13 which, in the case of phase synchronism of the modulation should be also in phase synchronism amounting to zero diaphragm deflection. Adjustment of the equipment can be facilitated here by providing the second chamber (10) in path I with frusto conical configuration with reflecting inner wall.

The entire radiation detector equipment (e.g. chambers 8, 9, 10, 20 with interconnecting ducts and resistance 17) are preferably cavities in a unitary metallic block so that it can be used as exchange for a detector in an analyzer already in use.

The invention is not limited to the embodiments described above but all changes and modifications thereof not constituting departures from the spirit and scope of the invention are intended to be included.

I claim:

1. A two beam infrared gas analyzer having means for providing two radiation beams which are periodically intercepted for intensity modulation of the two beams, further having a sensing capacitor in a chamber with a diaphragm partitioning the chamber and deflecting in response to pressure differences in the partitioned chamber thereby modulating the capacitance of the capacitor, there being circuit means reponsive to such capacitance modulation and providing an indication representative thereof, the improvement comprising:

sample gas cell means disposed in the two paths respectively of the two modulated beams so that both modulated beams traverse the same sample gas in the cell means;

a first and a second absorbtion chamber disposed respectively to receive the beams of radiation upon leaving said cell means after having traversed same;

a third absorbtion chamber disposed to receive the radiation as leaving the first absorbtion chamber; and pneumatic conduction means for connecting one side of said capacitor chamber to the second absorbtion chamber and the other side of the capacitor chamber to the third absorbtion chamber.

2. Analyzer as in claim 1, wherein the first and third absorbtion chambers are pneumatically interconnected through a flow resistance sufficiently high to throttle flow as a result of pressure modulation due to said intensity modulation.

3. Analyzer as in claim 1, wherein the first, second and third absorbtion chambers are filled with the same substance whose concentration is to be detected.

4. Analyzer as in claim 1, wherein the first, second and third chambers are adjusted so that for zero concentration of substance and phase synchronism of the modulator the deflection amplitude of the diaphragm is zero.

5. A detector for use in an infrared gas analyzer, the analyzer having means for providing two radiation beams which are periodically intercepted for intensity modulation of both beams, further having sample cell means disposed to be traversed by said two beams as modulated, comprising:

first and second absorbtion chambers disposed respectively to be serially traversed by one of said beams after having traversed the sample cell means;

a third absorbtion chamber disposed to be traversed by the other one of the beams after having traversed the sample cell means; and a chamber with partitioning diaphragm being part of a sensing capacitor for connection to an electrical sensing circuit and connected with one side to the second chamber as receiving radiation from the first chamber due to optically serial relationship between the first and second chambers, the chamber with diaphragm having its other side connected to the third chamber so that the diaphragm is deflected upon pressure differences between the second and third chambers.

6. A detector as in claim 5, wherein said first, second and third chambers and said diaghragm chamber are cavities in a metallic block traversed also by ducts for obtaining connections between the diaphragm chamber, and the second and third chambers.

7. A detector as in claim 6, wherein the connections include a duct between the first and second chambers with flow resistance to obtain low rate pressure equalization.

* * * * *